United States Patent
Gonzalez et al.

(10) Patent No.: US 9,322,448 B2
(45) Date of Patent: Apr. 26, 2016

(54) BICYCLE SHOCK ASSEMBLIES

(75) Inventors: Jose Gonzalez, Santa Clarita, CA (US); Gregory P. Buhl, Pasadena, CA (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 13/526,400

(22) Filed: Jun. 18, 2012

(65) Prior Publication Data

US 2012/0247893 A1 Oct. 4, 2012

Related U.S. Application Data

(63) Continuation of application No. 12/109,453, filed on Apr. 25, 2008.

(51) Int. Cl.
*F16F 9/02* (2006.01)
*F16F 9/32* (2006.01)
*F16F 9/48* (2006.01)

(52) U.S. Cl.
CPC .................. *F16F 9/3242* (2013.01); *F16F 9/48* (2013.01); *F16F 2230/32* (2013.01)

(58) Field of Classification Search
CPC ......... F16F 9/02; F16F 9/0209; F16F 9/3235; F16F 9/3242; F16F 9/325; F16F 9/443; F16F 9/446; F16F 9/48; F16F 9/486; F16F 9/489

USPC ..................... 188/266, 275; 267/64.11–64.28
See application file for complete search history.

(56) References Cited

U.S. PATENT DOCUMENTS

| | | | | |
|---|---|---|---|---|
| 3,990,687 | A * | 11/1976 | Curnutt | 267/225 |
| 6,708,803 | B2 * | 3/2004 | Jensen | 188/275 |
| 2003/0234144 | A1 * | 12/2003 | Fox | 188/278 |
| 2007/0093096 | A1 * | 4/2007 | Achenbach | 439/140 |

FOREIGN PATENT DOCUMENTS

| GB | 1500714 | * | 2/1978 |
|---|---|---|---|
| WO | WO2006065235 | * | 6/2006 |

* cited by examiner

*Primary Examiner* — Vishal Sahni

(57) ABSTRACT

A shock absorber, which is particularly applicable to bicycles, includes a mount body, a first cap portion, a second cap portion, and a fluid cylinder. The fluid cylinder cooperates with a valve assembly that is offset from the mount body. The first and second cap portions enclose a gas cavity or gas chamber. One of the first and second cap portions is interchangeable with other caps so as to alter the performance of the shock absorber by altering the size of the gas chamber. The replaceable cap cooperates with the mount body such that it can be replaced without removing the shock absorber from a bicycle.

18 Claims, 17 Drawing Sheets

BICYCLE SHOCK ASSEMBLIES

CROSS-REFERENCE TO RELATED PATENT APPLICATIONS

This application is a continuation of U.S. application Ser. No. 12/109,453, filed Apr. 25, 2008, which is incorporated herein by reference in its entirety.

BACKGROUND OF THE INVENTION

The present invention relates generally to bicycles and, more particularly, to shock assemblies that are constructed to facilitate controlled movement between movable members of a bicycle, such as a frame and a wheel assembly.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together with a rear dropout for supporting the rear axle of the rear wheel. The front wheel assembly is commonly mounted between a pair of forks that are pivotably connected to the frame proximate the head tube. The foregoing description represents the construction of a conventional bicycle frame which of course does not possess a suspension having any shock absorbing characteristics.

The increased popularity in recent years of off-road cycling, particularly on mountains and cross-country, as well as an interest in reducing discomfort associated with rougher road riding, has made shock absorbing systems a desirable attribute in biking system. A bicycle with a properly designed suspension system is capable of traveling over extremely bumpy, uneven terrain and up or down very steep inclines. Suspension bicycles are less punishing, reduce fatigue, reduce the likelihood of rider injury, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles. Over the last several years the number of bicycles now equipped with suspension systems has dramatically increased. In fact, many bicycles are now fully suspended, meaning that the bicycle has both a front and rear wheel suspension systems. Front suspensions were the first to become popular. Designed to remove the pounding to the bicycle front end, the front suspension is simpler to implement than a rear suspension. A front suspension fork is easy to retrofit onto an older model bicycle. On the other hand, a rear suspension will increase traction and assist in cornering and balance the ride.

During cycling, as the bicycle moves along a desired path, discontinuities of the terrain are communicated to the assembly of the bicycle and ultimately to the rider. Although such discontinuities are generally negligible for cyclists operating on paved surfaces, riders venturing from the beaten path frequently encounter such terrain. With the proliferation of mountain biking, many riders seek the more treacherous trail. Technology has developed to assist such adventurous riders in conquering the road less traveled. Wheel suspension systems are one such feature.

Even though suspension features have proliferated in bicycle constructions, the performance of the suspension as well as the structure of the bicycle are often limited to or must be tailored to cooperate with the structure and operation of the shock. Commonly, both ends of the shock are secured to the bicycle between movable frame members where movement is intended to be arrested, dampened, or otherwise altered. The shock is often connected between a portion of the frame and structure proximate an axle of an associated wheel to provide a desired travel distance and/or resistance to the relative displacement of the structures secured to the generally opposite ends of the shock. The incorporation of the shock member in such a manner generally determines the motion performance of the shock adapted structure.

Commonly, an eyelet is positioned at each end of the shock and cooperates with a pass through fastener that secures the respective ends of the shock to the desired structure of the bicycle. Other shock systems utilize a clamp that engages along an outside diameter of the damper body. This association of the structure of the bicycle and the structure of the shock generally defines the shock that can be used with any given bicycle as well as the shock performance that can be provided. To alter the shock performance of a particular bicycle commonly requires changing the shock provided the newly desired shock has a mount configuration and translation distance that correlates to the structure of the bicycle. Such a requirement increases the cost associated with performance of suspension features of any bicycle.

The rider must commonly acquire either various shocks assemblies or various parts of a shock assembly to alter the performance of suspension features of a particular bicycle. Further, if a rider has multiple bicycles, as many competitive riders do, acquiring the components to alter the performance of the suspension of a number of bicycles can be particularly expensive. With respect to shock manufacturing, as the structure of bicycle suspension features changes, shocks must be restructured to cooperate with the new bicycle structure. Shock design, construction, and assembly can become particularly costly in those instances where a variety of different shocks having different shock performance characteristics must be provided for one particular bicycle to satisfy individual rider preferences. Satisfying individual rider preferences across the various product platforms of various bicycle manufactures requires providing uncountable specific shock constructions.

Therefore, there is a need for a shock system that can be configured to cooperate with a variety of bicycle structures. There is a further need for a shock system that can provide a variety of shock performances without otherwise interfering with the mounting of the shock to the bicycle. There is a further need for a shock system that can be quickly and efficiently configured to cooperate with a bicycle.

BRIEF DESCRIPTION OF THE INVENTION

The present invention provides a shock for a bicycle that addresses one or more of the drawbacks discussed above. One aspect of the invention relates to a shock for a bicycle that includes a mount body constructed to be connected to the bicycle. The shock includes a first cap and a second cap. The first cap is connected to one side of the mount body and encloses a first cavity. The second cap is connected to a second side of the mount body and encloses a second cavity. Such a construction provides a shock assembly whose performance can be changed without altering the mounting of the shock and/or replacing the entire shock assembly.

Preferably, a passage is formed through the mount body so as to fluidly connect the first and second cavities. A further aspect includes providing a selector supported by the mount body and that is movable relative to the mount body to alter a performance characteristic of the shock. In a preferred aspect, the mount body includes at least one recess or through hole for securing the mount body between movable structures of a bicycle. Preferably, each securing recess or through hole is fluidly isolated from the interior cavities of the shock.

Another aspect of the invention usable with one or more of the above aspects includes forming one of the first cap and/or the second cap such that the cap is interchangeable so as to alter a size of the cavity associated with a replaced cap. Such a construction enhances the multi-functionality of the shock system. Preferably, at least one of the caps can be replaced without interfering with the mounting of the shock to a corresponding bicycle.

Another aspect of the invention usable with one or more of the above aspects includes providing a fluid reservoir that is fluidly associated with one of the first cap or the second cap so as to alter the fluid performance of the shock assembly independent of changing of a replaceable cap. Preferably, an auxiliary tank is connected to the mount body and fluidly connected to the fluid reservoir so as to further enhance the range of performance of the shock assembly.

Another aspect of the invention usable with one or more of the above aspects includes a bicycle suspension system having a mount, a sleeve, a cylinder, and a cap. The mount is securable to a first bicycle structure such that the sleeve extends from the mount. The cylinder is translatable relative to the sleeve and is securable to a second bicycle structure. The cap is secured to the mount such that the cap extends in an outboard direction relative to the first and second bicycle structures. Such a configuration provides a suspension system with a portion of a shock positioned outside that area generally disposed between the points of connection of the shock and the respective bicycle.

Another aspect of the invention usable with one or more of the above aspects is directed to a method of altering performance of the bicycle suspension system by altering a shock performance characteristic. The shock performance characteristic is altered by providing a shock having a first body and a second body. The first body is connected to one of a first or a second frame member of a bicycle. The second body is connected to the other of the first or second frame member of the bicycle such that the first and second bodies are movable relative to one another to allow translational movement between the first and second frame members with a desired suspension characteristic. The suspension system includes an interchangeable third body that cooperates with the first body so as to alter the shock performance characteristic thereby providing a shock system that can be configured to provide a desired suspension performance.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

DETAILED DESCRIPTION OF THE PREFERRED EMBODIMENT

Figure 1:
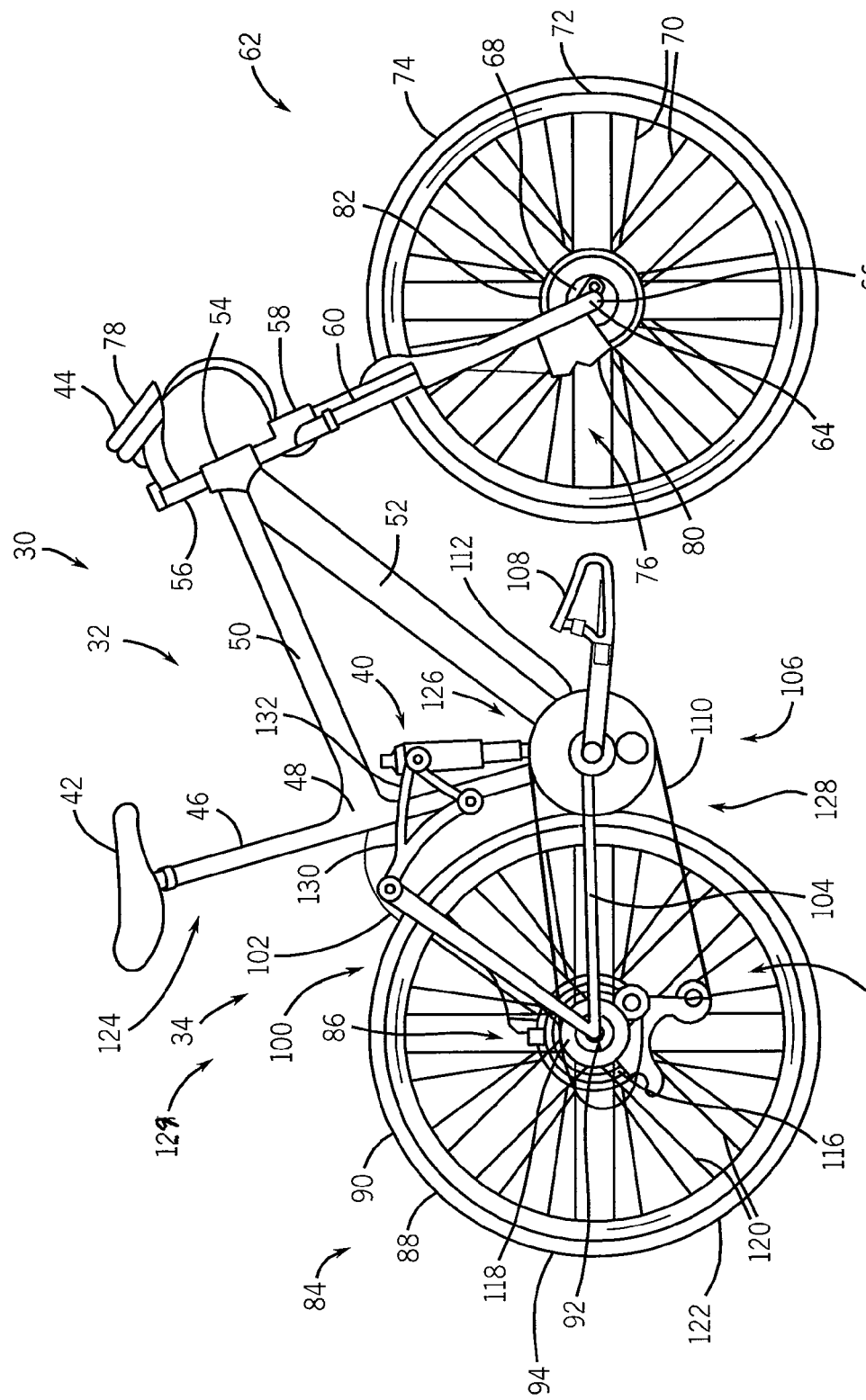
FIG. 1 is an elevational view of a bicycle equipped with a shock assembly according to the present invention.

FIG. 1 shows a bicycle 30 having a frame assembly 32 equipped with a rear wheel suspension system 34 that includes a shock absorber, shock assembly, or shock 40 according to the present invention. Bicycle 30 includes a seat 42 and handlebars 44 that are attached to frame assembly 32. A seat post 46 is connected to seat 42 and slidably engages a seat tube 48 of frame assembly 32. A top tube 50 and a down tube 52 extend forwardly from seat tube 48 to a head tube 54 of frame assembly 32. Handlebars 44 are connected to a stem 56 that passes through head tube 54 and engages a fork crown 58. A pair of forks 60 extend from generally opposite ends of fork crown 58 and support a front wheel assembly 62 at an end of each fork or a fork tip 64. Fork tips 64 engage generally opposite sides of an axle 66 that cooperates with a hub 68 of front wheel assembly 62. A number of spokes 70 extend from hub 68 to a rim 72 of front wheel assembly 62. A tire 74 extends about rim 72 such that rotation of tire 74, relative to forks 60, rotates rim 72 and hub 68.

Preferably, each fork 60 is provided as a shock absorber so as to allow translation of axle 66 of front wheel assembly 62 relative to frame assembly 32. Although each fork 60 is shown as having respective ends secured proximate one of frame assembly 32 and axle 66, it is appreciated that the hereafter description of shocks according to one or more of the embodiments of the present invention are equally applicable to bicycle front wheel suspension features.

Bicycle 30 includes a front brake assembly 76 having an actuator 78 attached to handlebars 44. Brake assembly 76 includes a caliper 80 that cooperates with a rotor 82 to provide a stopping or slowing force to front wheel assembly 62. A rear wheel assembly 84 of bicycle 30 also includes a disc brake assembly 86 having a rotor 88 and a caliper 90 that are positioned proximate a rear axle 92. A rear wheel 94 is positioned generally concentrically about rear axle 92. Understandably, one or both of front wheel assembly 62 and rear wheel assembly 84 could be equipped with other brake assemblies, such as brakes assemblies that include structures that engage the rim or tire of a respective wheel assembly.

A rear wheel suspension system 100 is pivotably connected to frame assembly 32 and allows rear wheel 94 to move independent of seat 42 and handlebars 44. Suspension system 100 includes a seat stay 102 and a chain stay 104 that offset rear axle 92 from a crankset 106. Crankset 106 includes oppositely positioned pedals 108 that are operationally connected to a chain 110 via a chain ring or sprocket 112. Rotation of chain 110 communicates a drive force to a rear section 114 of bicycle 30. A gear cluster 116 is positioned at rear section 114 and engaged by chain 110. Gear cluster 116 is generally concentrically orientated with respect to rear axle 92 and includes a number of variable diameter gears. Gear cluster 116 is operationally connected to a hub 118 of rear wheel 94 of rear wheel assembly 84. A number of spokes 120 extend radially between hub 118 and a rim 122 of rear wheel assembly 84. As is commonly understood, rider operation of pedals 108 drives chain 110 thereby driving rear wheel 94 which in turn propels bicycle 30.

Frame assembly 32 includes a first frame member or forward frame portion 124 that generally includes seat tube 48, top tube 50, down tube 52, and head tube 54. A bottom bracket 126 is formed proximate the interface of seat tube 48 and down tube 52 and is constructed to operatively connect crankset 106 to bicycle frame assembly 32. A first end 128 of chain stay 104 is pivotably connected to forward frame portion 124 proximate bottom bracket 126 to allow a second frame member or rear frame portion 129 to pivot or rotate relative to forward frame portion 124. As shown, rear frame portion 129 generally includes chain stays 104, seat stays 102, and a pivot or rocker arm 130 that is attached to forward frame portion 124. Preferably, rocker arm 130 is pivotably attached to seat tube 48 of forward frame portion 124.

Rocker arm 130 includes a forward arm 132 that extends inboard relative to seat tube 48. Shock 40 is secured between forward arm 132 of rocker arm 130 and a position proximate bottom bracket 126. Shock 40 may be attached directly to forward frame portion 124. Preferably, chain stay 104 is pivotably attached to seat tube 48 and extends forward of seat tube 48 proximate bottom bracket 126. Such a construction indirectly secures shock 40 to forward frame portion 124 and allows both mounting points of shock 40 to move or pivot during operation of suspension system 100. This orientation of suspension system 100 is more fully described in applicants copending U.S. patent application having Ser. No. 11/735,816 filed on Apr. 16, 2007, the disclosure of which is incorporated herein.

Shock 40 arrests, suppresses, or dampens motion between rear frame portion 129 and forward frame portion 124. Understandably, frame assembly 32 is exemplary of one frame assembly usable with the present invention. Other frame assemblies, such as frame assemblies having other moveable frame structures or other shock orientations are envisioned. Shock 40 could be positioned in any of a number of positions relative to forward frame portion 124. For instance, when located in a forward position, as mentioned above, shock 40 could provide a forward wheel suspension feature wherein one end of the shock is secured proximate a forward wheel axle and another end of the shock is secured nearer frame assembly 32. In a rearward position, shock 40 could be positioned rearward of seat tube 48, such as between a seat stay and seat tube 48. In still other embodiments, rather than the generally vertical orientation shown in FIG. 1, it is envisioned that shock 40 be generally aligned with top tube 50 and engaged with a U-shaped seat stay that would be movable relative to seat tube 48. Understandably, these and other implementations of shock 40 are envisioned and within the scope of the claims.

Figure 2:
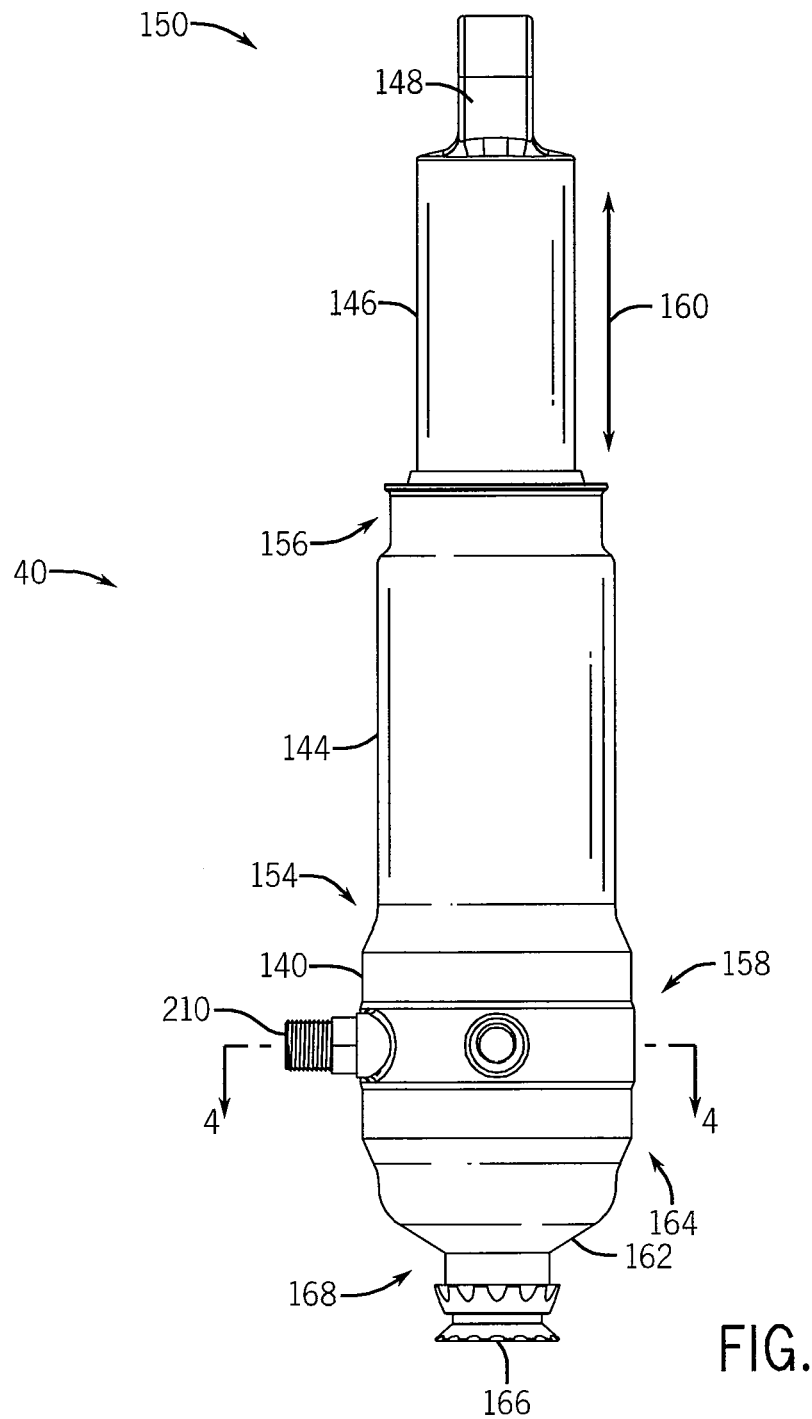
FIG. 2 is a side view of the shock assembly or shock removed from the bicycle shown in FIG. 1.

FIG. 2 shows shock 40 removed from bicycle 30. Shock 40 includes a mount or mount body 140 disposed between a first cap 142 and a second cap or sleeve 144. Shock 40 includes a cylinder 146 that is translatable relative to sleeve 144. An eyelet 148 is formed at a first end 150 of shock 40 and provides a first point for mounting of shock 40 to bicycle 30. Sleeve 144 extends between a first end 154 and a second end 156. First end 154 of sleeve 144 cooperates with a first end 158 of mount body 140 and second end 156 of sleeve 144 slidably receives cylinder 146. Cylinder 146 is translatable, indicated by arrow 160, within sleeve 144 relative to mount body 140. The distance of translation of cylinder 146 is defined roughly by the overlapping lengths of sleeve 144 and cylinder 146.

Shock 40 includes a second cap 162 that is attached to an end 164 of mount body 140 opposite sleeve 144. Cap 162, as with all of the outboard caps of the multiple embodiments disclosed herein, is constructed to removably cooperate with mount body 140. The illustrated cap 162 is exemplary of one size and shape of cap usable with the present invention. That is, mount body 140 is constructed to cooperate with any of a number of differently sized caps. As described further below, such a construction allows shock 40 to be configured to individual user preferences without otherwise interfering with the interaction of connection of shock 40 with bicycle 30.

Figure 3:
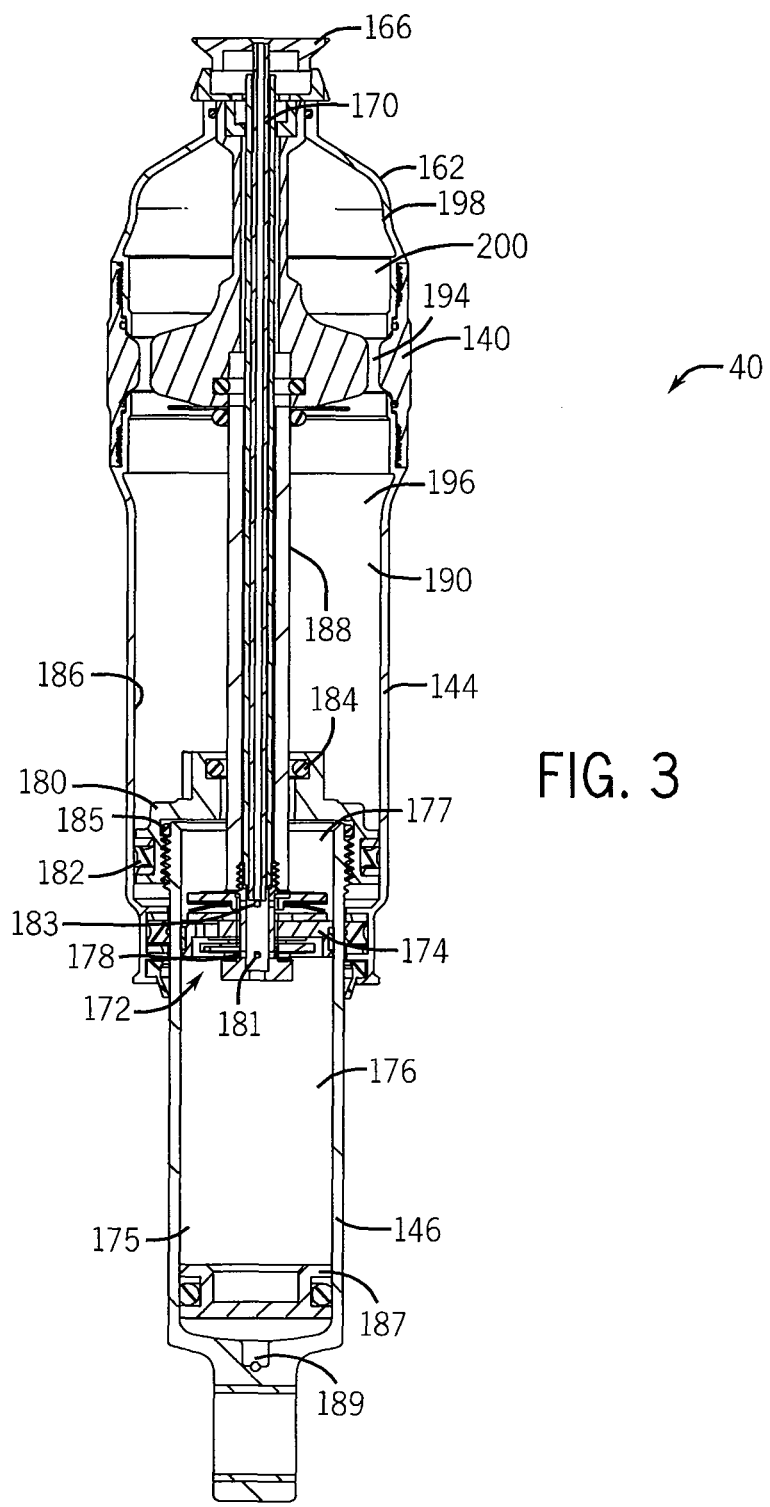
FIG. 3 is a longitudinal cross-sectional view of the shock assembly shown in FIG. 2.

An operator, such as a dial 166, is positioned near a second end 168 of shock 40 and can be adjusted to alter the suspension performance of shock 40. Referring to FIG. 3, a stem 170 extends from dial 166 into mount body 140. Stem 170 is operatively connected to a valve assembly 172 positioned in cylinder 146. Valve assembly 172 includes a piston 174 that is positioned in a cavity 176 of cylinder 146. Piston 174 divides cavity 176 into a first chamber 175 and a second chamber 177. The position of piston 174 is fixed relative to sleeve 144 but is constructed to accommodate the translation of cylinder 146 relative to sleeve 144.

A passage 178 fluidly connects chambers 175, 177 on opposite sides of piston 174. Preferably, passage 178 includes upper and lower orifices 181, 183, respectively, that dictate the performance of a flow of fluid, such as oil, between chambers 175, 177. Cylinder 146 includes a cap 180 that has a first seal 182, a second seal 184, and a third seal 185. First seal 182 slidably cooperates with an interior surface 186 of sleeve 144. Second seal 184 slidably cooperates with an exterior surface 188 of stem 170. Third seal 185 cooperates with cylinder 146 so as to maintain the volume of fluid in cylinder 146. A float 187 and a vent 189 cooperate with cylinder 146 so as to equalize the pressure on opposite sides of piston 174 during translation of cylinder 146 relative to sleeve 144. Manipulation of dial 166 alters the exposure or size of orifices 181, 183 and thereby alters the dampening performance of shock 40.

A volume 190 is formed by sleeve 144, mount body 140, and end cap 162. A passage 194 is formed through mount body 140 and fluidly connects a cavity 196 associated with sleeve 144 and a cavity 198 associated with cap 162. Accordingly, the combination of cavity 196 and cavity 198 defines a gas or air chamber 200 of shock 40. As alluded to above, cap 162 removably cooperates with mount body 140 and dial 166 such that caps having other sizes and/or shapes can be connected to mount body 140. Altering the size and/or shape of cap 162 alters the volume of cavity 198 and thereby alters the volume of air chamber 200 of shock 40. Understandably, altering air chamber 200 alters the air spring performance of shock 40.

Figure 4:
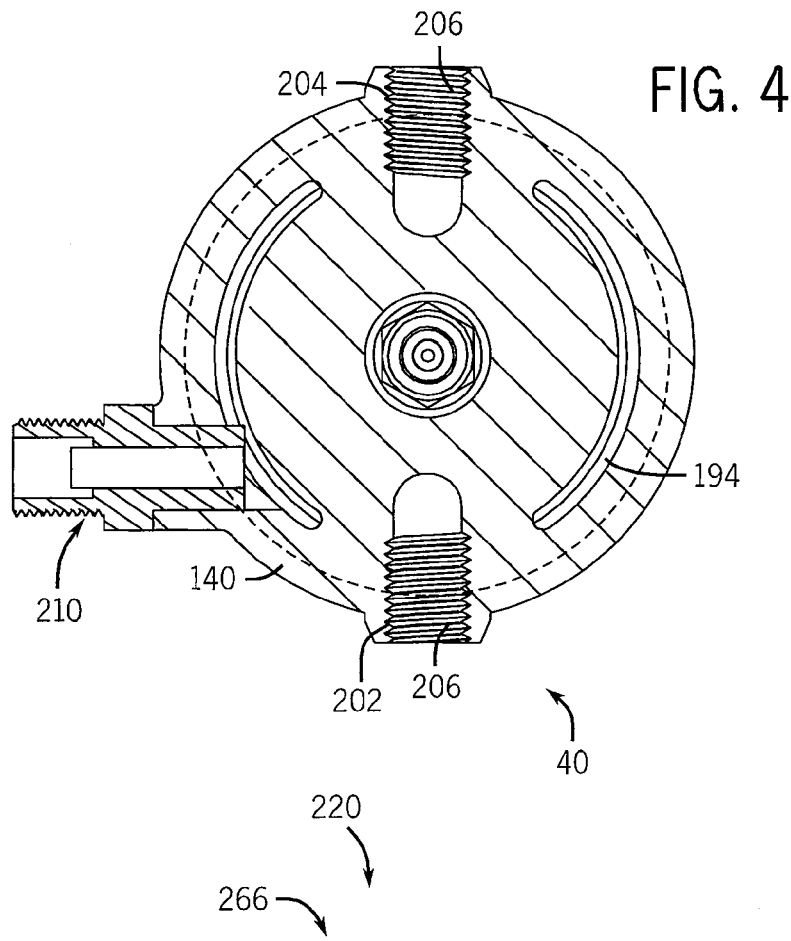
FIG. 4 is a lateral cross-sectional view of a mount body taken along line 4-4 of the shock shown in FIG. 3.

Referring to FIG. 4, mount body 140 includes a first opening 202 and a second opening 204 that are located generally opposite one another. Preferably, openings 202, 204 each include a number of threads 206 that cooperate with a fastener (not shown) for securing shock 40 to bicycle 30. Openings 202, 204 are fluidly isolated from one another and fluidly isolated from any of the gas or fluid chambers, such as passage 194 of shock 40. Alternatively, as will be described further below, openings 202, 204 could be constructed as a through opening or bore so as to receive the shank of a fastener or the like. It is appreciated that openings 202, 204 could be fluidly connected to air chamber 200 provided mounting fasteners would be sealing engaged therewith.

Mount body 140 includes a valve assembly 210. Valve assembly 210 allows pressurization of air chamber 200 of shock 40. One example of valve assembly 210 common to many arts, such as tires, is commonly referred to as a Schrader valve. Valve assembly 210 cooperates with shock 40 such that the amount of gas associated chamber 200 could be adjusted. It is appreciated that chamber 200 could be charged with any of air, nitrogen, carbon dioxide, etc. For most riders, chamber 200 is commonly operated in the range of about 100 to about 150 psi. Understandably, other pressure ranges are envisioned. Lighter riders may prefer a less rigid suspension performance and may desire gas pressures nearer about 25 psi whereas larger riders may prefer a more robust spring response and prefer pressures nearer about 300 psi. Understandably, the size and pressure of chamber 200 can be configured to individual rider preference. Such a construction further enhances the ability to individualize the suspension performance operation of shock 40. Shock 40 includes a number of features for providing an individual rider's desired suspension performance by simply altering the fluid performance of cylinder 146 via manipulation of dial 166 or through changing cap 162 to alter the performance of air chamber 200, or via altering the pressure associated with chamber 200. Each of these shock performance features can be utilized without otherwise altering the mounting of shock 40 to bicycle 30.

Figure 7:
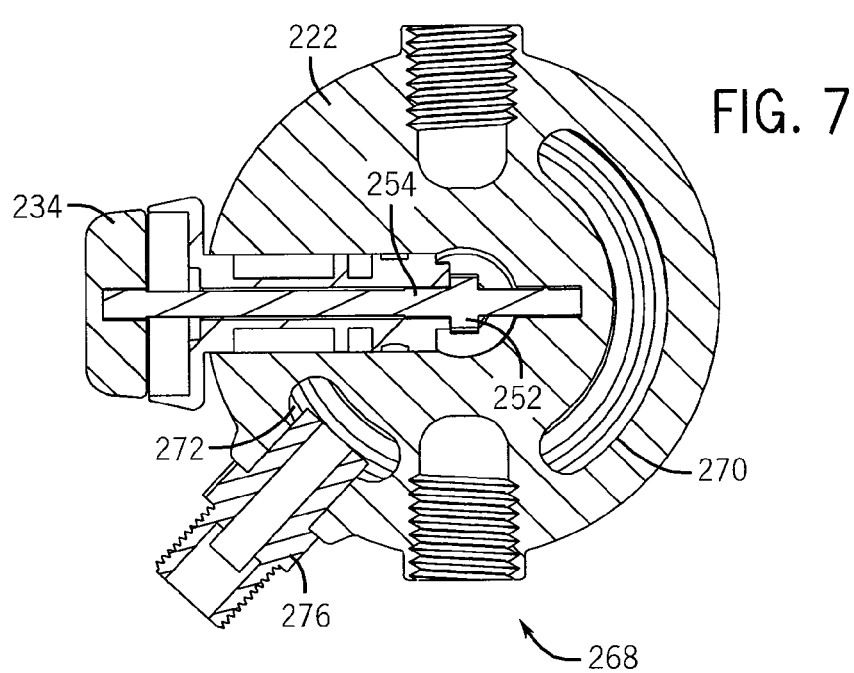
FIG. 7 is a lateral cross-sectional view of a mount body taken along line 7-7 of the shock shown in FIG. 5.
Figure 5:
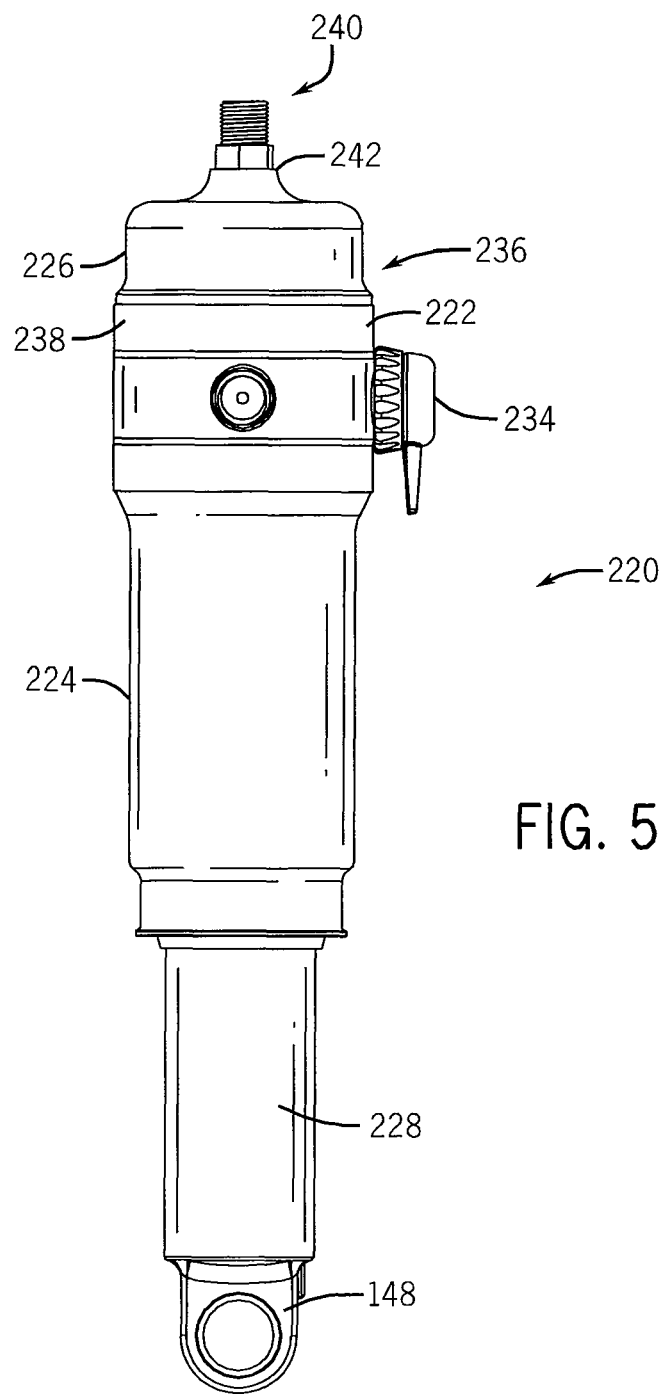
FIG. 5 is a side view of a shock according to another embodiment of the invention.
Figure 6:
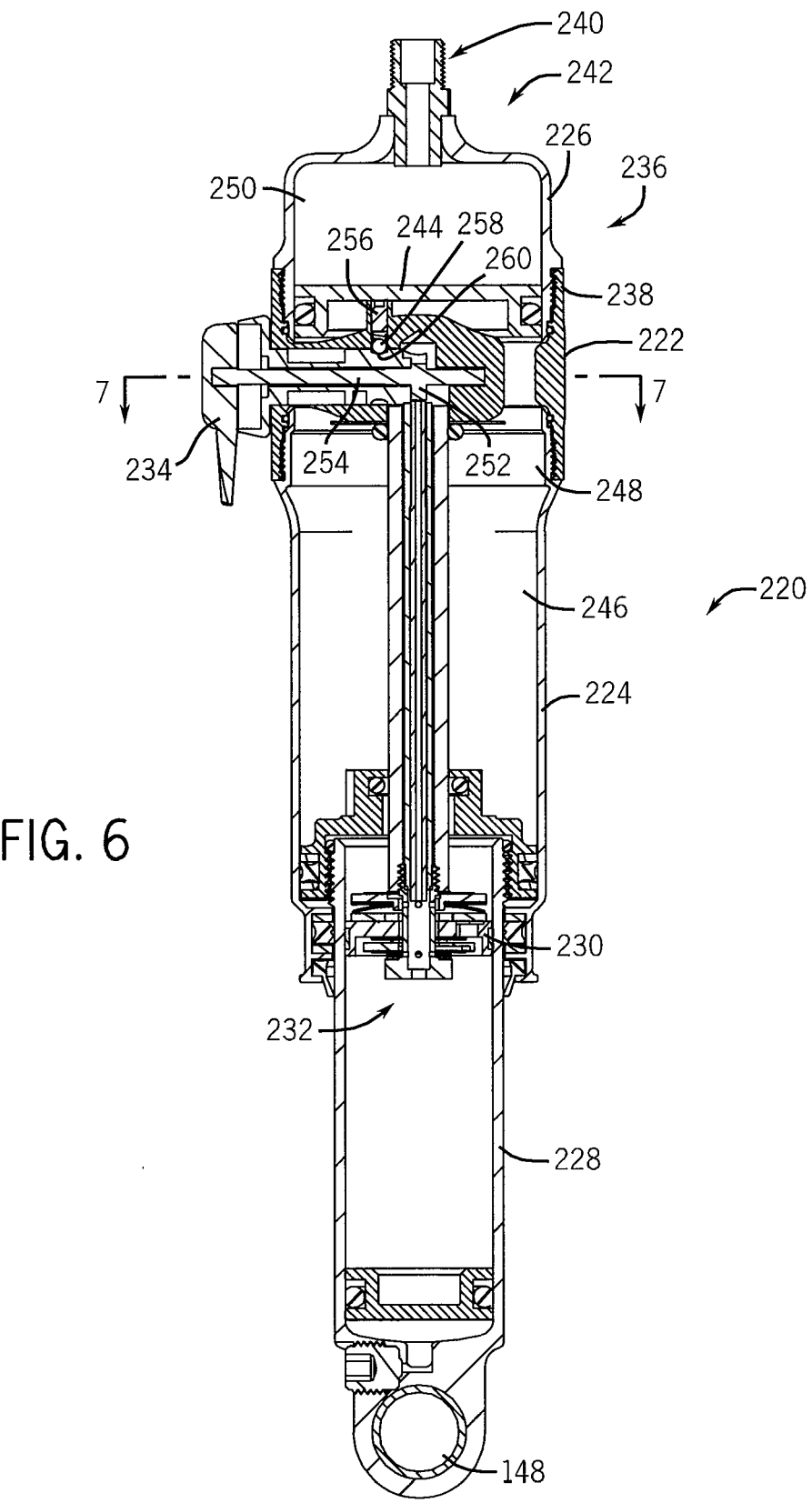
FIG. 6 is a longitudinal cross-sectional view of the shock shown in FIG. 5.

FIGS. 5-7 show a shock assembly or shock 220 according to another embodiment of the invention. Referring to FIGS. 5 and 6, shock 220 includes a mount body 222 positioned between the first cap or sleeve 224 and a removable or replaceable second cap 226. A cylinder 228 is slidably positioned relative to sleeve 224. A piston 230 and valve assembly 232 is constructed and operates in a similar manner as that described above with respect shock 40. Accordingly, like reference numbers have been used to describe features common to various embodiments according to the present invention.

Unlike shock 40, wherein dial 166 extends from a longitudinal end of the shock, shock 220 includes an operator or dial 234 that extends from a lateral side of mount body 222. A first end 236 of replaceable cap 226 is threadably engaged with an end 238 of mount body 222. A valve assembly 240 is operatively associated with another end 242 of replaceable cap 226. Valve assembly 240 is generally similar to or the same as valve assembly 210. A piston 244 is slidably disposed within cap 226 and separates an air chamber 246 of shock 220 into a first air volume 248 and a second air volume 250. Such a construction allows air volume 250 to be charged with gas, such as nitrogen, carbon dioxide or air to a first pressure that is generally greater that a gas pressure associated with first air volume 248. As described below, such a configuration allows a user to flatten the spring performance of shock 220 by withholding the contribution of air volume 250 from the performance of shock 220 until volume 248 attains a pressure sufficient to displace piston 244.

Dial 234 is connected to a cam 252 that manipulates the performance of valve assembly 232. A stem 254 extends between cam 252 and dial 234 and cooperates with an indicator 256, such as a ball 258 and detent 260. Indicator 256 provides in operator with an audible or tactile indication of the adjustment of dial 234.

As shown in FIG. 7, mount body 222 of shock 220 includes first and second recesses 266, 268 that facilitate mounting shock 220 to desired structure of bicycle 30. Although recesses 266, 268 are shown as closed threaded bores, it is appreciated that recesses 266, 268 could be provided as a through passage. Understandably, dial 234 and stem 254 would need to be offset from recesses 266, 268 along the longitudinally length of mount body 222 in such a configuration. A number of passages 270, 272 are formed through mount body 222 and allow volume 250 of cap 226 to contribute to the spring performance of shock 220.

As shown in FIG. 7, shock 220 includes a second valve assembly 276 that extends through mount body 222 and is fluidly connected to air volume 248. Valve assembly 276 allows a user to pressurize air chamber 246 so as to provide a desired spring performance over an initial travel of shock 220. Once cylinder 228 has translated an amount sufficient to compress the gas of volume 248 to a value proximate the pressurization of volume 250, volumes 248, 250 collectively contribute to the spring performance of shock 220. Such a construction enhances the range of desired suspension characteristics that can be achieved with shock 220. Similar to shock 40, replacing cap 226 with a cap having a volume other than that shown also alters the spring performance of shock 220. As cap 226 is positioned outboard of the locations that shock 220 is secured to the structure of bicycle 30, i.e. not between eyelet 148 and mount body 222, cap 226 can readily be replaced without otherwise altering the mounting of shock 220 to bicycle 30.

Figure 8:
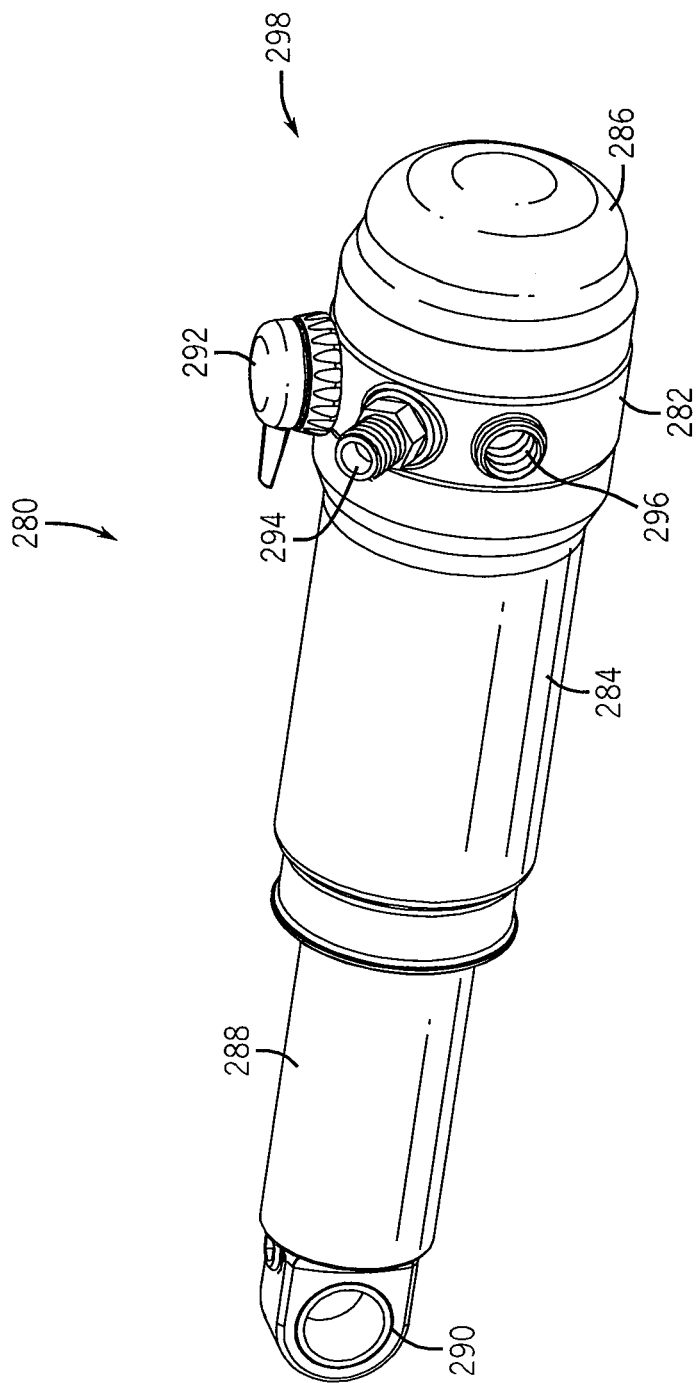
FIG. 8 is a side view of a shock according to another embodiment of the invention.
Figure 9:
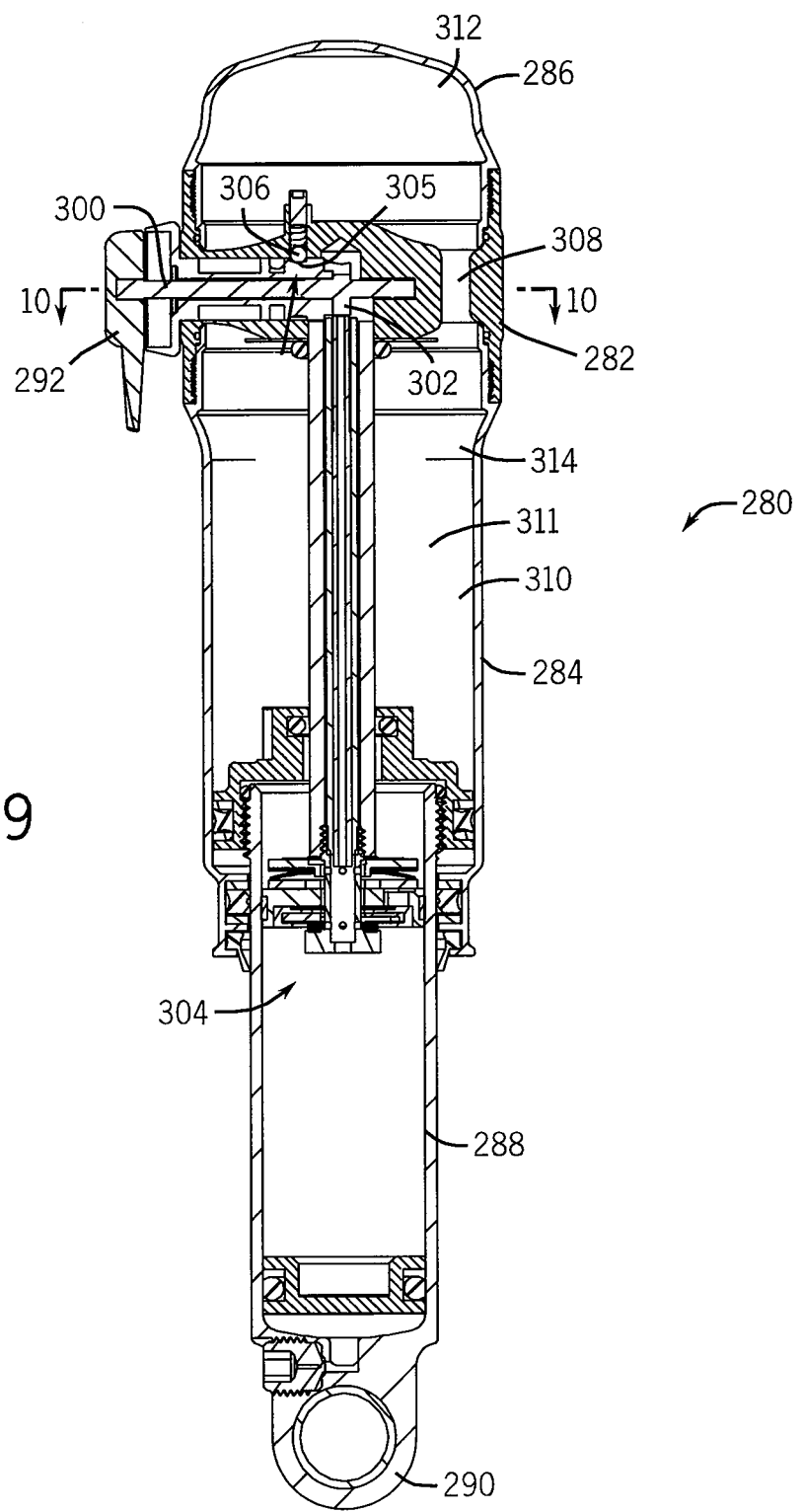
FIG. 9 is a longitudinal cross-sectional view of the shock shown in FIG. 8.
Figure 10:
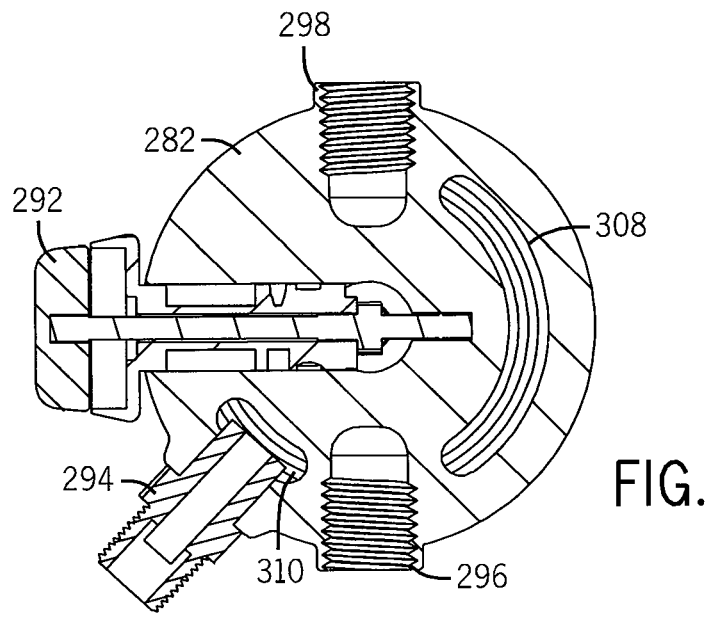
FIG. 10 is a lateral cross-sectional view of a mount body taken along line 10-10 of the shock shown in FIG. 9.

FIGS. 8-10 show a shock 280 according to another embodiment of the invention. The construction of shock 280 is generally similar to shock 220. Shock 280 includes a mount body 282 disposed between a sleeve 284 and a replaceable cap 286. A cylinder 288 is slidably received in sleeve 284 and includes an eyelet 290 located at an end thereof. Mount body 282 includes in operator or dial 292, a valve assembly 294, and a pair of recesses 296, 298 positioned on generally opposite sides of mount body 282. As best shown in FIG. 9, a stem 300 extends from dial 292 and includes a cam 302 that operatively interacts in an offset manner with a valve assembly 304 associated with cylinder 288. Stem 300 includes a number of detents 305 that cooperate with a ball 306 to provide a tactile or audible indication of the position of dial 292 and thereby indicating an operating orientation of valve assembly 304.

One or more passages 308, 310 are formed through mount body 282 and fluidly connect a volume 311 (a first positive gas chamber) enclosed by sleeve 284 and a volume 312 (a second positive gas chamber) enclosed by cap 286. Unlike shock 220, whose air chamber 246 includes volumes 248, 250 separated by cap piston 244, shock 280 includes a fixed volume upper air chamber 314 whose volume is generally defined as the area enclosed between mount body 282 and cap 286. Similar to shock 220, cap 286 can be replaced with caps having other sizes and/or shapes to alter the spring performance of shock 280.

Referring to FIG. 10, recesses 296, 298 are threaded to cooperate with a fastener engaged therewith such that mount body 282 can be secured to a bicycle 30. A user, desiring to alter the performance of shock 280, need merely replace cap 286 with a cap that encloses a volume associated with a desired suspension characteristic. Similar to shocks 40, 220, positioning cap 286 outboard of the mounting locations of shock 280, allows shock 280 to be configured to provide a desired suspension performance without otherwise manipulating the connection of the shock to a bicycle.

Figure 13:
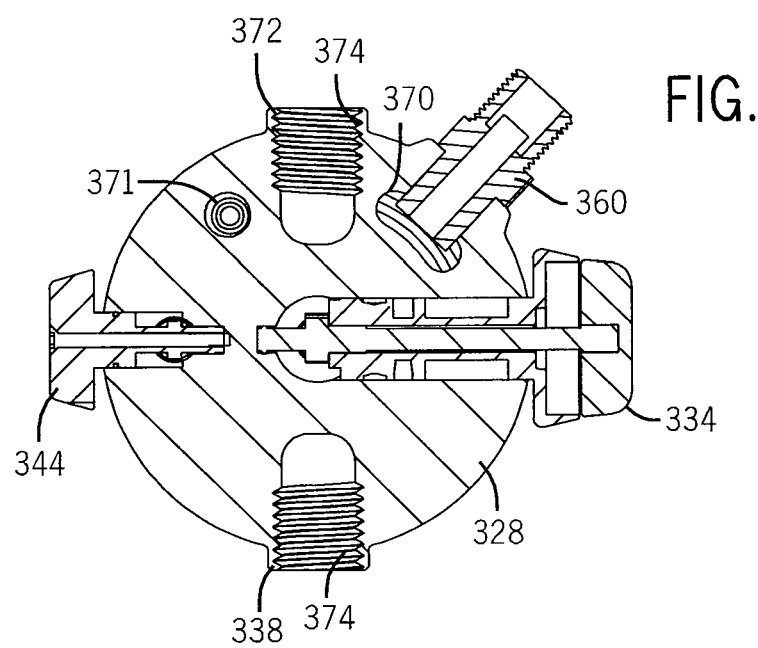
FIG. 13 is a lateral cross-sectional view of a mount body taken along line 13-13 of the shock shown in FIG. 12.
Figure 11:
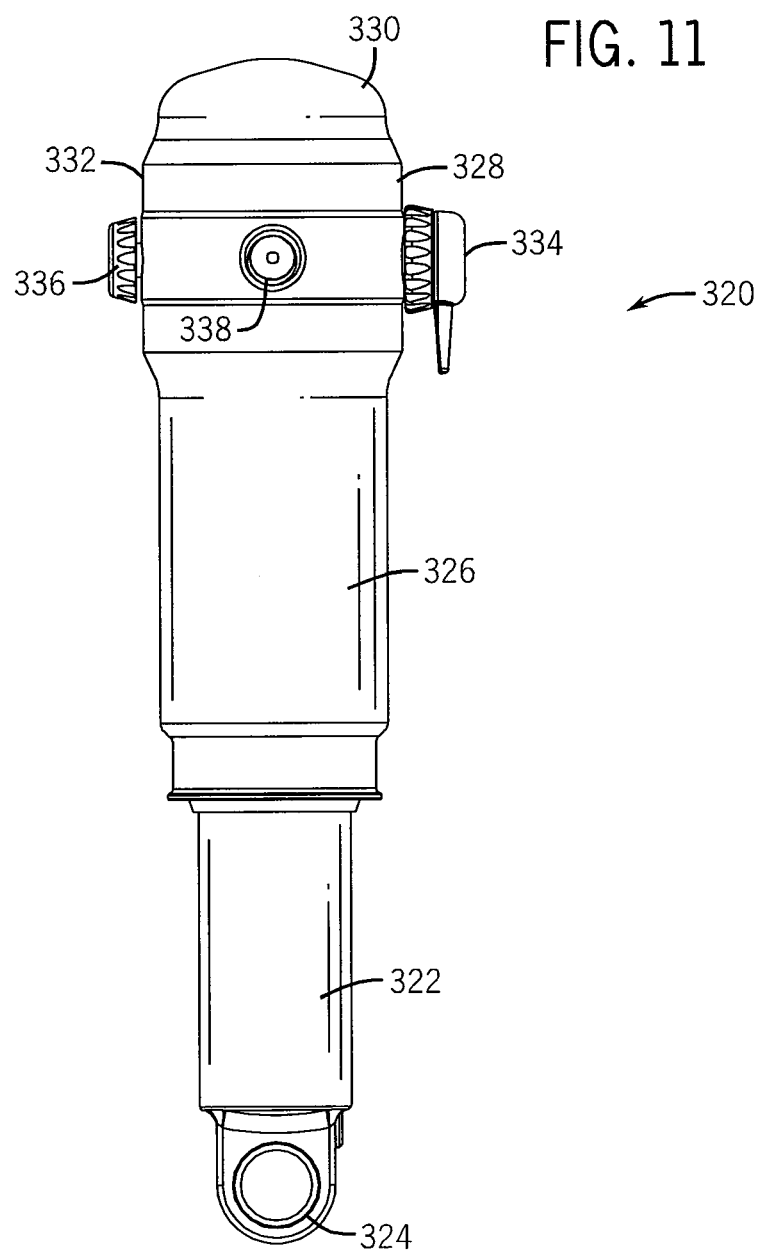
FIG. 11 is side view of a shock having an adjustable pressure relief according to another embodiment of the invention.
Figure 12:
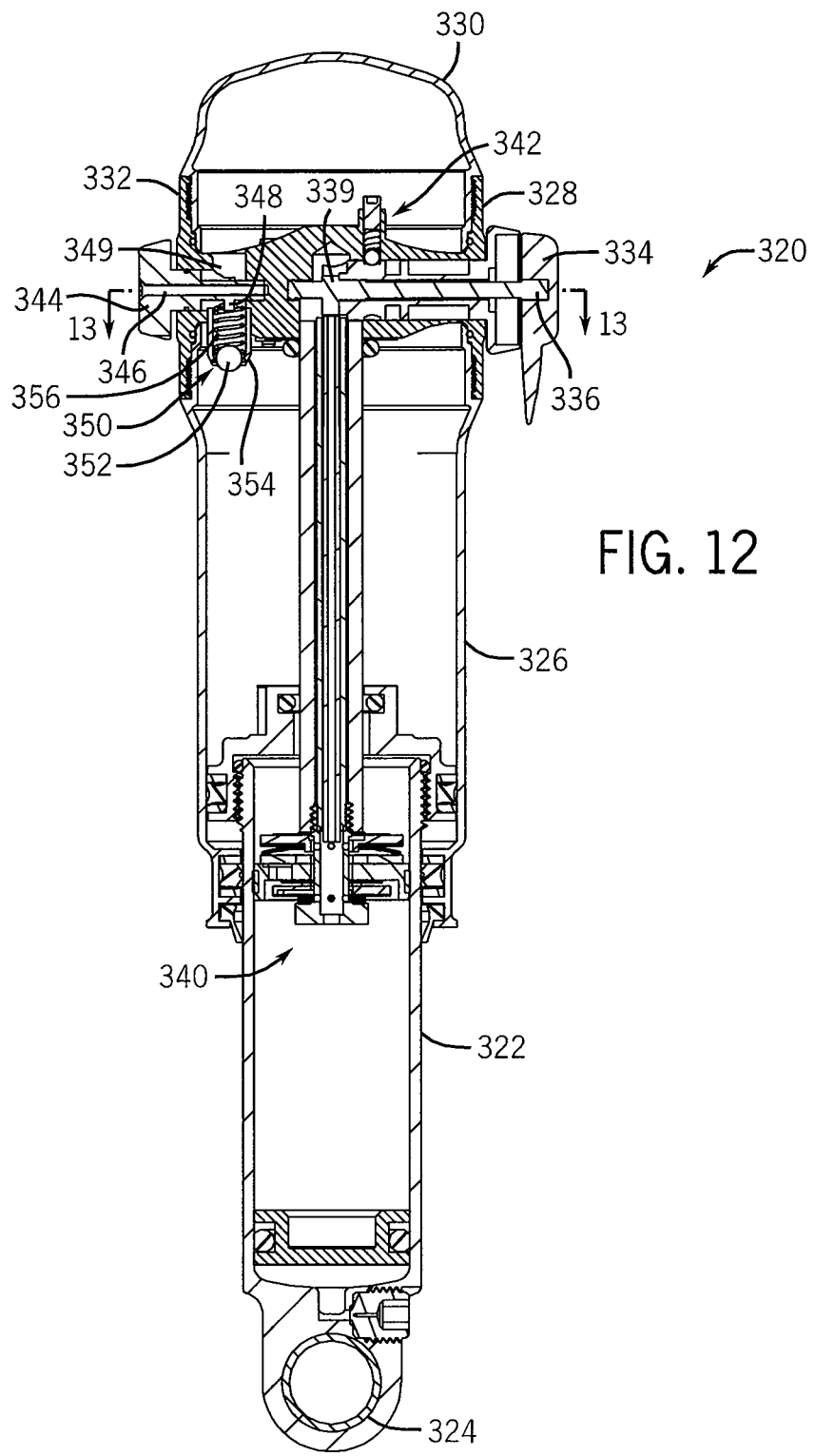
FIG. 12 is a longitudinal cross-sectional view of the shock shown in FIG. 11.
Figure 14:
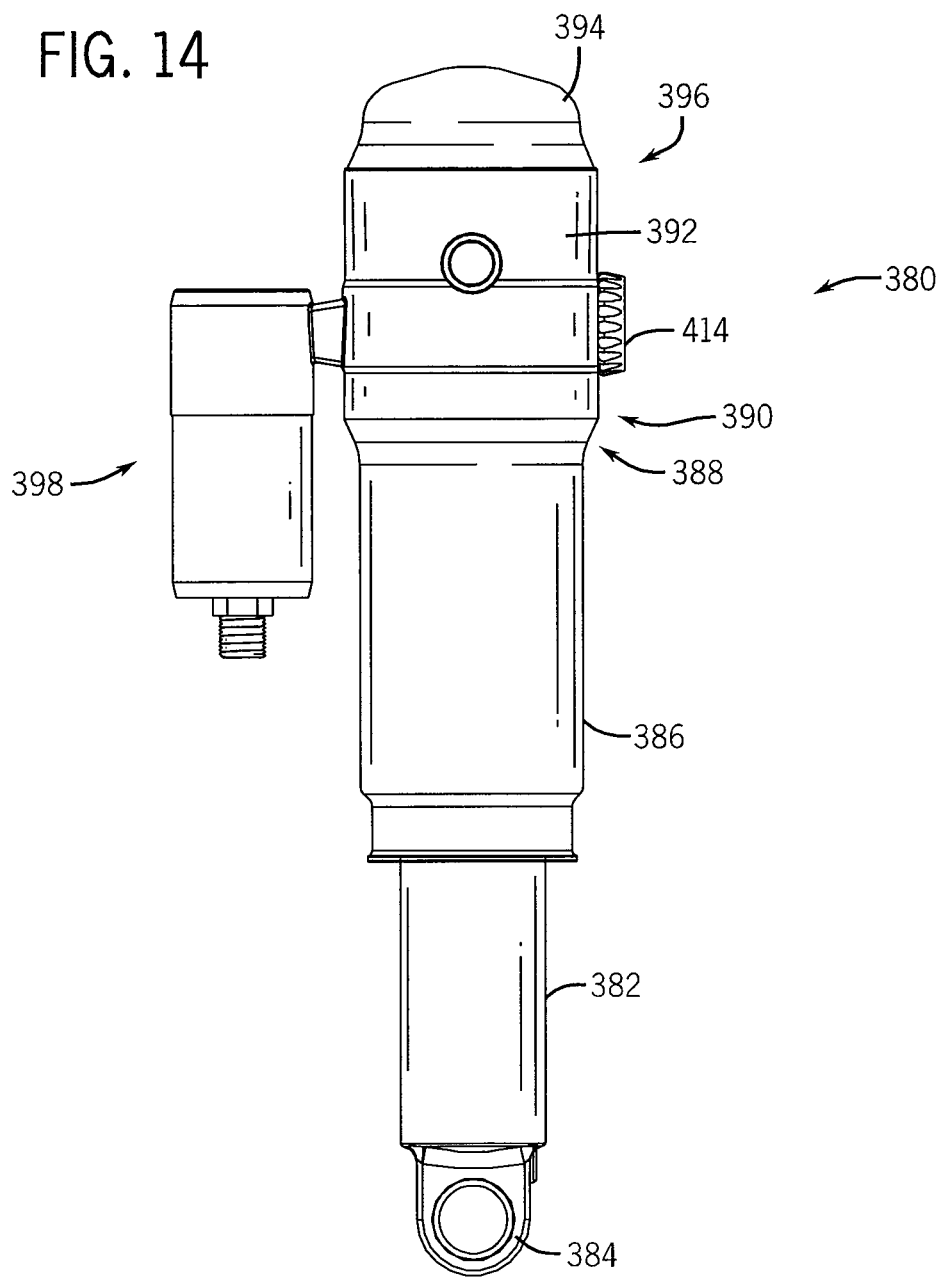
FIG. 14 is a side view of a shock having an auxiliary reservoir according to another embodiment of the invention.

FIGS. 11-13 show a shock 320 according to another embodiment of the invention. Referring to FIGS. 11 and 12, shock 320 includes a cylinder 322 having an eyelet 324 positioned at one end thereof. Cylinder 322 slidably cooperates with a sleeve 326 that is attached to a mount body 328. A cap 330 is attached to an end 332 of mount body 328 generally opposite sleeve 326. Shock 320 includes a first operator or dial 334 that is oriented and constructed generally similar to dial 292 of shock 280. A shaft 336 extends from dial 334 into mount body 328 and has a cam 339 formed thereon. Manipulation of dial 334 alters the configuration of a valve assembly 340 associated with the fluid chamber of cylinder 322. An indicator assembly 342 interacts with dial 334 to provide an audible or tactile indication of the position of dial 334 and thereby an indication of the setting of valve assembly 340.

Shock 320 includes a second operator or dial 344 that is also attached to mount body 328. A stem 346 extends from dial 344 and includes a cam 348 formed thereon. A passage 349 is formed through mount body 328 proximate cam 348. Passage 349 fluidly connects the volumes enclosed by sleeve 326 and cap 330. Mount body 328 includes a valve assembly 350 that interrupts passage 349 and cooperates with cam 348. Valve assembly 350 includes a ball 352 that cooperates with a seat 354 associated with mount body 328. A spring 356 is disposed in passage 349 and biases ball 352 into seat 354. Cam 348 cooperates with spring 356 in such a manner that a user can vary the force that ball 352 is biased into seat 354 via manipulation of dial 344. During a compression stroke, gas enclosed by sleeve 326 must be compressed to overcome the load associated with spring 356 before the volume associated with cap 330 can contribute to the performance of shock 320. Dial 344 allows a user to alter the pressure associated with allowing cap 330 to contribute to the performance of shock 320. Accordingly, shock 320 is configured to provide a progressive response to suspension activity.

Referring to FIG. 13, mount body 328 includes a valve assembly 360 that is fluidly connected to the volume enclosed by sleeve 326. An opening 370 is formed through mount body 328 proximate valve assembly 360 and fluidly connected to the volume enclosed by sleeve 326. During the initial configuration of shock 320, the volume enclosed by sleeve 326 is pressurized. If the initial pressure is greater than the bias of spring 356, ball 352 is biased out of engagement with seat 354 such that a portion of the gas enters the chamber enclosed by cap 330 even without displacement of cylinder 322. During an initial compression stroke, gas is displaced from the chamber associated with sleeve 326 into the chamber associated with cap 330 such that a greater pressure is maintained in the chamber enclosed by cap 330 as compared to the chamber associated with sleeve 326 for subsequent strokes of shock 320. Similar to shock 220, such a configuration provides a shock with a variable spring response across the range of translation of the cylinder thereof. Simply, as the volume associated with sleeve 326 is compressed to a degree sufficient to overcome the bias of spring 356, gas enclosed by cap 330 is allowed to contribute to the performance of shock 320.

Similar to shocks 40, 220, and 280, mount body 328 of shock 320 includes a recess 372 that is positioned generally opposite recess 338. Recesses 338, 372 include a number of threads 374 that cooperate with fasteners for securing shock 320 to corresponding structure of bicycle 30. Valve assemblies 350, 371, as well the cooperation of differently sized replaceable caps 330, allow shock 320 to provide a progressive or variable suspension performance feature that can be tailored to individual user preferences.

FIGS. 14-17 show a shock 380 according to another embodiment of the invention. Shock 380 includes a cylinder 382 having an eyelet 384 and being slidably position relative to a sleeve 386. An end 388 of sleeve 386 is attached to a first end 390 of a mount body 392. A replaceable cap 394 is removably attached to a second end 396 of mount body 392. Shock 380 includes a fluid reservoir 398 that is fluidly connected to a cavity 400 of cylinder 382. Reservoir 398 includes a float 402 and a vent port 404 constructed to accommodate changes in a fluid level associated with reservoir 398.

A passage 406 is formed through mount body 392 and fluidly connected to a stem 408 that extends between mount body 392 and a valve assembly 410 positioned in cavity 400 of cylinder 382. A volume 412 of reservoir 398 compliments the volume associated with cavity 400 of cylinder 382 so as to provide a shock with an improved range of translation.

Figure 15:
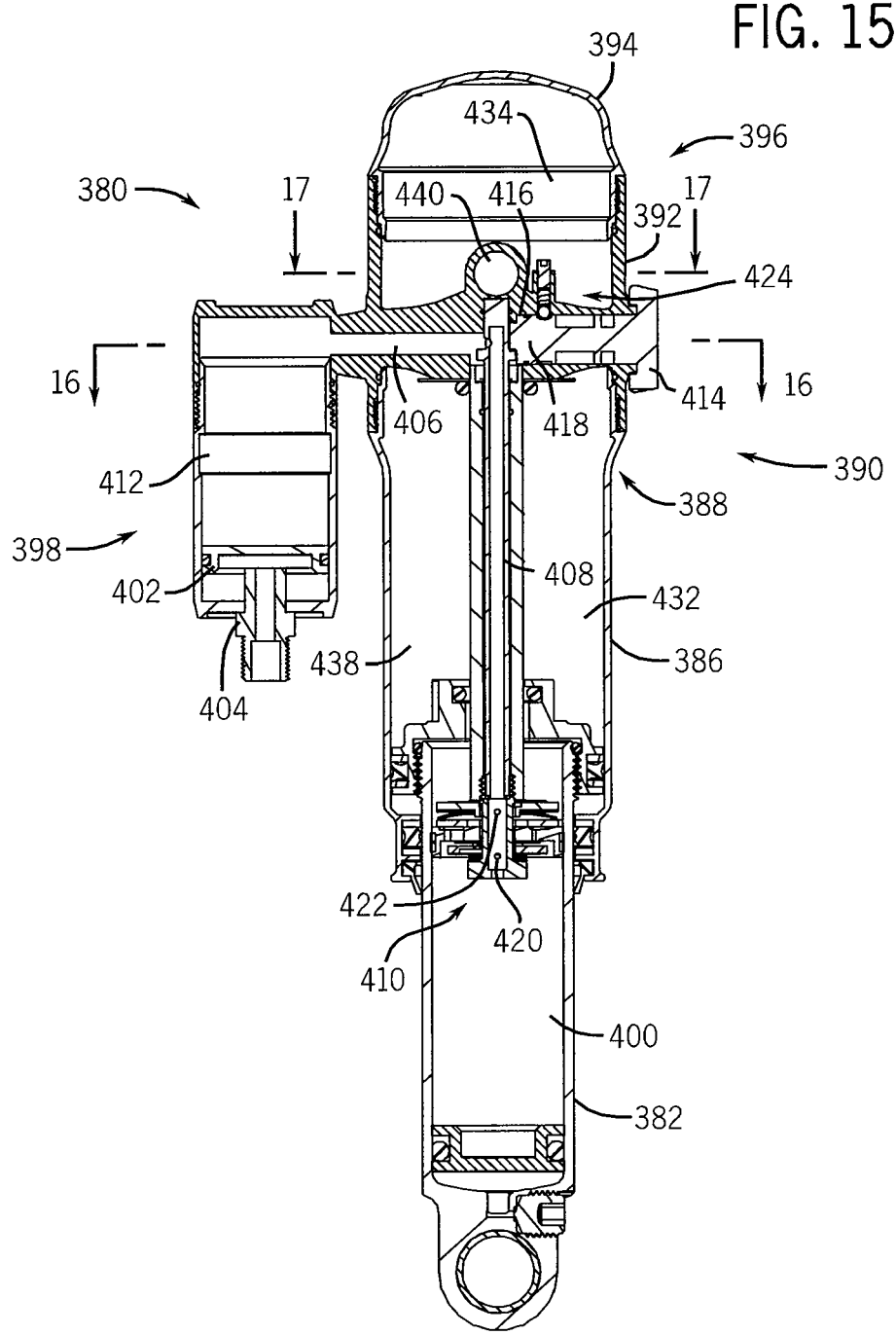
FIG. 15 is a longitudinal cross-sectional view of the shock shown in FIG. 14.
Figure 16:
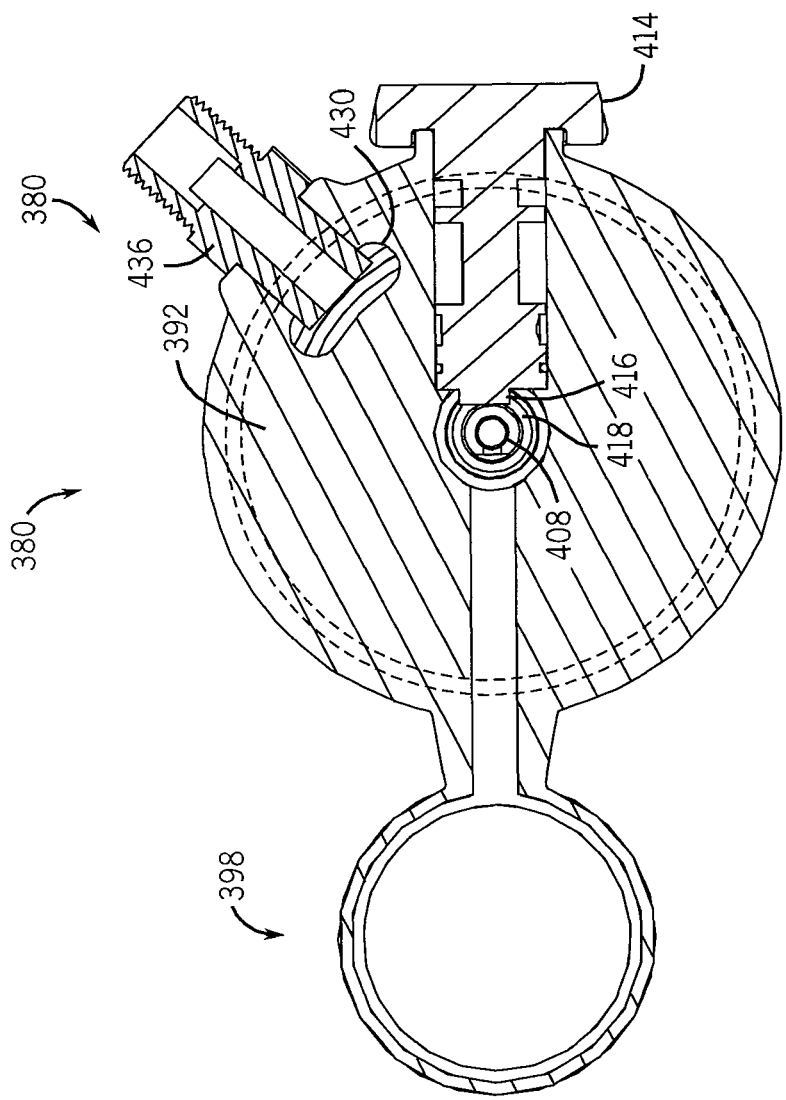
FIG. 16 is a lateral cross-sectional view of a mount body taken along line 16-16 of the shock shown in FIG. 15.

Shock 380 includes an operator or dial 414 that interacts with stem 408 so as to alter the fluid performance of valve assembly 410. As shown in FIGS. 15 and 16, dial 414 includes a cam 416 that cooperates with a surface 418 of stem 408 so as to alter the fluid performance of orifices 420, 422 of valve assembly 410. Shock 380 includes an indicator 424 that cooperates with dial 414 so as to provide a tactile or audible indication of changes to a suspension performance feature of shock 380. Understandably, although reservoir 398 is shown as being integrally formed with mount body 392, passage 406 could be constructed to cooperate with a separate body such that reservoir 398 would be otherwise severable from mount body 392. Such a configuration would allow shock 380 to be configured for operation with or without reservoir 398. Such a construction further enhances the multi-functionality and variety of suspension performance characteristics that can be achieved with of shock 380.

Figure 17:
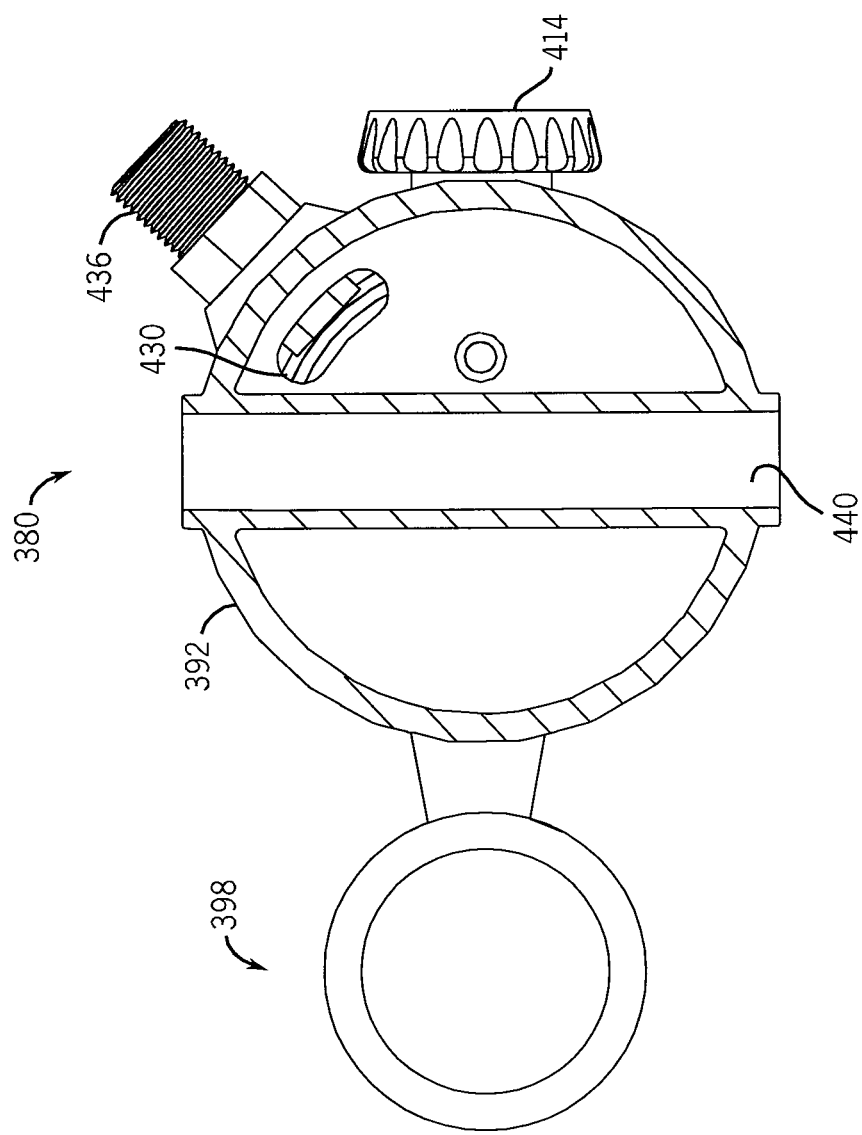
FIG. 17 is a view of the mount body similar to FIG. 16 and taken along line 17-17 shown in FIG. 15.

As shown in FIGS. 16 and 17, mount body 392 includes an opening 430 that fluidly connects a volume 432 (FIG. 15) enclosed by sleeve 386 and a volume 434 (FIG. 15) enclosed by cap 394. Similar to the shock operations described above, shock 380 includes a valve assembly 436 is also connected to mount body 392 and allows venting or charging of a chamber 438 formed by the combination of volumes 432 and 434.

Referring to FIGS. 15 and 17, unlike shocks 40, 220, and 280, shock 380 includes a mount recess that is formed as a passage 440 that extends completely through mount body 392. Passage 440 is offset along a longitudinal axis of shock 380 from an axis of dial 414 and passage 406 associated with reservoir 398. As shown in FIG. 17, passage 440 extends uninterruptedly through mount body 392. Preferably, passage 440 is oriented in a crossing direction with respect to an axis of passage 406. More preferably, passage 440 is orientated to be generally perpendicular to the longitudinal axis of dial 414 and fluid passage 406. Such a construction allows shock 380 to be compactly integrated into the structure of bicycle 30. Furthermore, forming mounting recess or passage 440 as a through bore allows shock 380 to be constructed in a lightweight manner with reduced workability and further enhances the serviceability of a bicycle equipped with such a shock. That is, passage 440 avoids activities associated with forming or servicing the internal threads associated with the previously described bores. Any damage to complementary mounting hardware and/or fasteners can be economically resolved via replacement of such mounting hardware rather than servicing of shock 380.

Figure 18:
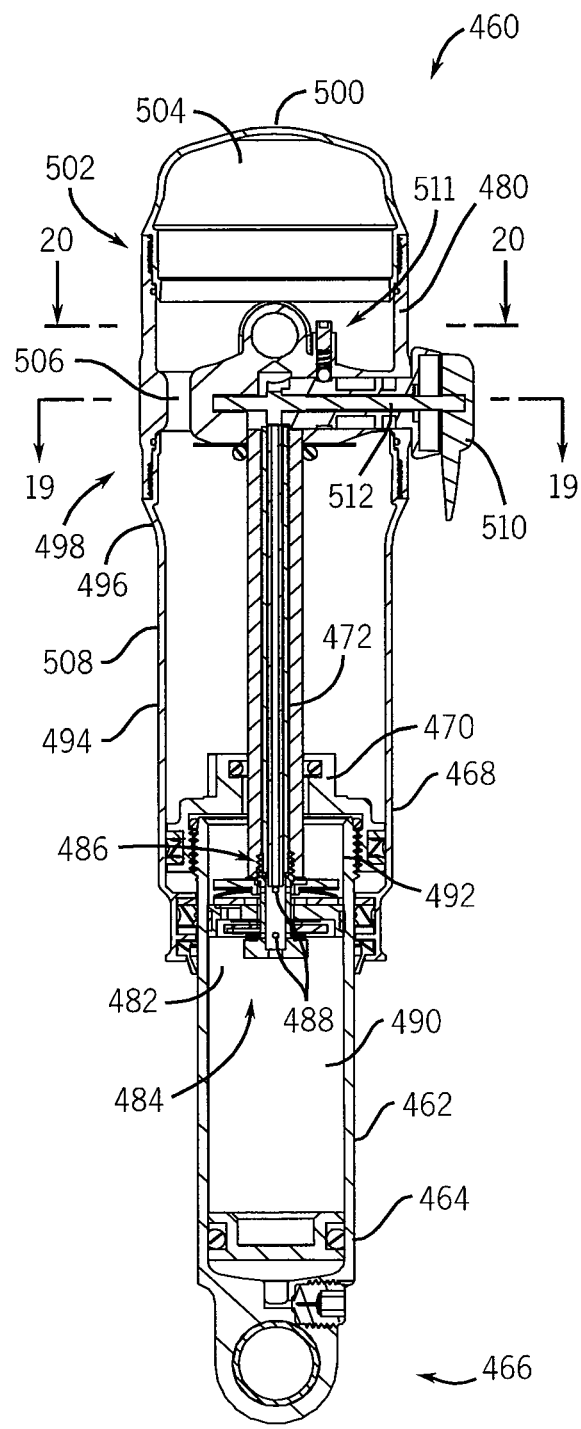
FIG. 18 is a longitudinal cross-sectional view of a shock according to another embodiment of the invention.
Figure 19:
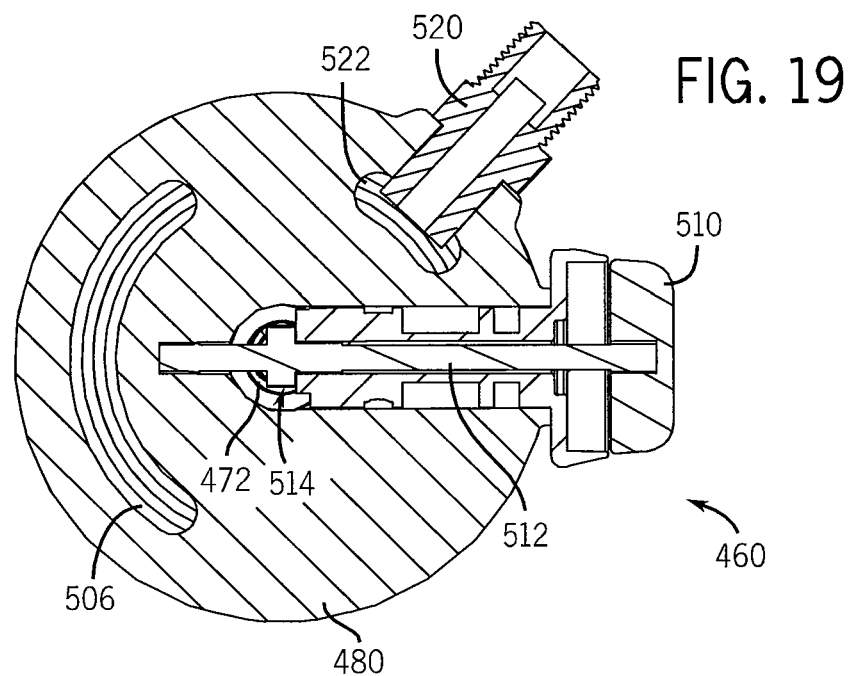
FIG. 19 is a lateral cross-sectional view of a mount body taken along line 17-17 of the shock shown in FIG. 18.
Figure 20:
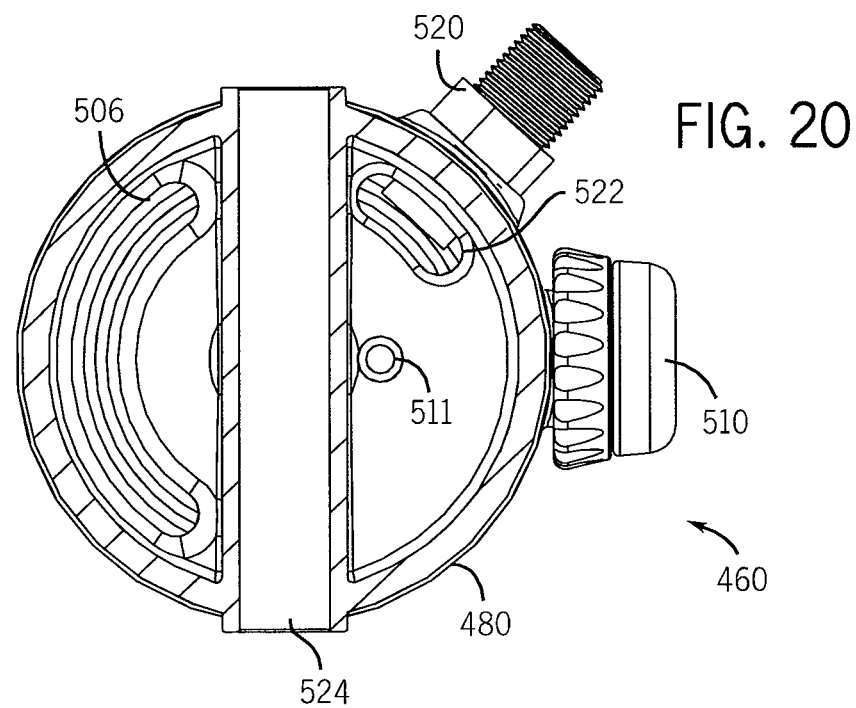
FIG. 20 is a view of the mount body similar to FIG. 19 and taken along line 20-20 of the shock shown in FIG. 18.

FIGS. 18-20 show a shock 460 according to another embodiment of the invention. As shown in FIG. 18, shock 460 includes a cylinder 462 having an eyelet 464 at an end 466 thereof. Cylinder 462 is slidably engaged with a sleeve 468. Cylinder 462 includes a cap 470 that cooperates with a stem 472 which extends from a mount body 480. A piston 482 and a valve assembly 484 are positioned at an end 486 of stem 472. A number of ports or orifices 488 are formed on valve assembly 484 and determine the passage of fluid between respective chambers 490, 492 of cylinder 462. Cylinder 462 is translatable along stem 472 within cavity 494 of sleeve 468. An end 496 of sleeve 468 is attached to a first end 498 of mount body 480. A removable or replaceable cap 500 is attached to an end 502 of mount body 480 generally opposite sleeve 468. A cavity 504 is formed between cap 500 and mount body 480. Cavity 494 and cavity 504 are fluidly connected via a passage 506 formed through mount body 480. Cavity 494, passage 506, and cavity 504 cooperate to define an air chamber 508 of shock 460.

As shown in FIGS. 18 and 19, shock 460 includes an operator, such as a dial 510, that is connected to a stem 512 that interacts with stem 472 extending to valve assembly 484. Manipulation of dial 510 alters the orientation of a cam 514 relative to stem 472 thereby altering the fluid performance of orifices 488. Referring to FIGS. 19 and 20, mount body 480 includes a valve assembly 520 that is generally aligned with another passage 522 formed through mount body 480. Passage 522 also fluidly connects cavities 494 and 504. Similar to shock 380, shock 460 includes a mounting recess or passage 524 that extends through mount body 480. Referring to FIGS. 19 and 20, similar to passage 440 of shock 380, passage 524 of shock 460 is fluidly isolated from dial 510 and stem 512 and from passages 506 and 522 of mount body 480. Furthermore, as passage 524 extends through body 480 in an uninterrupted manner, passage 524 provides a simple and robust connection for shock 460 to bicycle 30.

Each of shocks 40, 220, 280, 320, 380, and 460 include a mount or mount body that is positioned somewhere other than an end point of the respective shock. Such an orientation allows each of shocks 40, 220, 280, 320, 380, and 460 to be configured for a desired performance which includes the alteration of a performance characteristic of the shock without otherwise altering the mounting of the shock with a respective bicycle. Each of mount bodies 140, 222, 282, 328, 392, and 480 are constructed to be secured to a bicycle such that the respective cap 162, 226, 286, 330, 394, 500 is located outboard with respect to the area between the mounting points of the respective shock. Whether the mount body is provided with one or more closed recesses, such as mount bodies 140, 222, 282, 328, or a through bore, such as mount bodies 392, 480, each mounting arrangement provides a robust structure for securing a respective shock to a bicycle.

Each of caps 162, 226, 286, 330, 394, and 500 is removable and/or replaceable such that caps having sizes and/or shapes other than those shown can cooperate with the respective shock. Altering the size of a respective cap alters the volume of the gas chamber associated with the shock and thereby alters the spring performance of the respective shock. Each shock 40, 220, 280, 320, 380, and 460 preferably further includes structure for adjusting the performance of the valve associated with the fluid orifices of the shock structures. Such preferable structure further enhances the functionality of the respective shocks.

Providing additional preferable fluid controls, such as the pair of valve assemblies 240, 276 of shock 220, the cap piston 244 of shock 220, valve assembly 350 of shock 320, or reservoir 398 of shock 380, further enhances the functionality and adjustability of shocks according to the present invention. Regardless of the embodiment employed, each of shocks 40, 220, 280, 320, 380, and 460 provides a shock that can be tuned to the preferences of a rider, is robust and lightweight, and is useable across a number of bicycle types and product platforms. Further, each of shocks 40, 220, 280, 320, 380, and 460 provides a shock that can be quickly and efficiently produced and configured for a number of different operating environments in a variety of orientations relative to front and rear suspension features of bicycles. It is further appreciated that aspects of one or more aspects of the various embodiments of the invention, such as valves 240, 276, 350, piston 244, and reservoir 398 can be combined with one or more features of the various embodiments to achieve shock constructions, configurations, and operations other than the preferred configurations that have been described above. The forthcoming claims are intended to encompass all such deviations and combinations of the respective features disclosed herein. That is, no one aspect of the present invention is exclusive to the particular embodiment within which such aspect is discussed.

The present invention has been described in terms of the preferred embodiments, and it is recognized that equivalents, alternatives, and modifications, aside from those expressly stated, are possible and within the scope of the appending claims. It is further appreciated that the respective features of any one of the embodiments discussed above is not necessarily solely exclusive thereto. That is, as described in the forth coming claims, the invention includes all of the embodiments as well as aspects specific thereto.

What is claimed is:

1. An apparatus comprising:
   a first positive gas chamber consisting of:
      a sleeve including a first mounting point; and
      a cylinder including a second mounting point;
      wherein:
         the cylinder translates into the sleeve over a translation range from a fully extended position of the sleeve and the cylinder to a fully compressed position of the sleeve and the cylinder;

the translation range is divided into a predetermined first translation range from the fully extended position to a valve activation, position followed by a predetermined second translation range from the valve activation position to the fully compressed position; and the valve activation position is static in the translation range;

a second positive gas chamber associated with the sleeve; and a valve assembly configured to:

automatically fluidly isolate the first positive gas chamber from the second positive gas chamber only during the predetermined first translation range; and automatically fluidly couple the first positive gas chamber and the second positive gas chamber only during the predetermined second translation range.

2. The apparatus of claim 1, wherein the valve assembly comprises a passage.

3. The apparatus of claim 2, wherein the valve assembly comprises a biasing member and a bias adjustment mechanism configured to, adjust the valve activation position.

4. The apparatus of claim 1, wherein:

the valve assembly is closed during the predetermined first translation range and the valve assembly is open during the predetermined second translation range;

the predetermined first translation range and the predetermined second translation range are both greater than zero in length; and the valve activation position is fixed relative to the sleeve such that:

when a cycle of the sleeve and the cylinder occurs completely within the predetermined first translation range, the valve assembly does not change state;

when a cycle of the sleeve and the cylinder occurs completely within the predetermined second translation range, the valve assembly does not change state; and when a cycle of the sleeve and the cylinder crosses the valve activation position, the valve assembly changes state.

5. The apparatus of claim 4, wherein the valve assembly is configured to open at a predetermined pressure associated with the valve activation position.

6. The apparatus of claim 1, further comprising a damping mechanism associated with the cylinder.

7. The apparatus of claim 6, wherein a piston of the damping mechanism is located inside the cylinder, and the piston divides the cylinder into a first damping chamber and a second damping chamber.

8. The apparatus of claim 7, wherein the damping mechanism comprises an auxiliary damping chamber fluidly coupled to the second damping chamber.

9. The apparatus of claim 1, wherein the second positive gas chamber comprises a removable cap.

10. An apparatus comprising:

a first positive gas chamber, wherein a volume of the first positive gas chamber is associated with a first mounting point of the first positive gas chamber and a second mounting point of the first positive gas chamber, and wherein the first positive gas chamber consists of a sleeve coupled to the first mounting point and a cylinder coupled to the second mounting point;

wherein:

the first mounting point translates relative to the second mounting point over a translation range from a fully extended position of the first mounting point and the second mounting point to a fully compressed position of the first mounting point and the second mounting point;

the translation range is divided into a predetermined first translation range from the fully extended position to a valve activation position followed by a predetermined second translation range from the valve activation position to the fully compressed position; and the valve activation position is static in the translation range;

a second positive gas chamber; and a valve assembly configured to:

automatically fluidly couple the first positive gas chamber to the second positive gas chamber only when a pressure in the first positive gas chamber has reached a predetermined pressure corresponding to the valve activation position; and automatically fluidly isolate the first positive gas chamber from the second positive gas chamber only when the pressure in the first positive gas chamber is below the predetermined pressure corresponding to the valve activation position.

11. The apparatus of claim 10, wherein the valve assembly comprises a valve and the valve is configured to open when the pressure in the first positive gas chamber has reached the predetermined pressure.

12. The apparatus of claim 10, wherein the valve assembly comprises a passage.

13. The apparatus of claim 10, wherein the predetermined pressure is associated with a predetermined translation point of the cylinder into the sleeve.

14. The apparatus of claim 10, wherein the valve assembly is configured to depressurize the second positive gas chamber while the cylinder extends in the predetermined second translation range.

15. The apparatus of claim 10, further comprising a damping mechanism located in the cylinder.

16. The apparatus of claim 10, wherein the second positive gas chamber is defined at least in part by a removable cap and at least a portion of the sleeve, and the first mounting point is located between the first positive gas chamber and the second positive gas chamber.

17. The apparatus of claim 10, wherein a volume of the second positive gas chamber is fixed.

18. The apparatus of claim 10, further comprising an adjustment mechanism configured to set the predetermined pressure.

* * * * *